United States Patent [19]

Nomura et al.

[11] 4,412,118
[45] Oct. 25, 1983

[54] WIRE-CUT, ELECTRIC DISCHARGE MACHINE

[75] Inventors: Yoshiyuki Nomura; Kanemasa Okuda, both of Hino, Japan

[73] Assignee: Fujitsu Fanuc Limited, Tokyo, Japan

[21] Appl. No.: 272,190

[22] Filed: Jun. 10, 1981

[30] Foreign Application Priority Data

Jun. 30, 1980 [JP] Japan ................................ 55-89386

[51] Int. Cl.³ ................................................ B23P 1/08
[52] U.S. Cl. ................................ 219/69 W; 219/69 S
[58] Field of Search ............... 219/69 M, 69 R, 69 W, 219/69 S, 69 V

[56] References Cited

U.S. PATENT DOCUMENTS

| | | | |
|---|---|---|---|
| 3,636,296 | 1/1972 | Semin | 219/69 W |
| 3,987,270 | 10/1976 | Ullmann et al. | 219/69 W |
| 4,232,208 | 11/1980 | Buhler | 219/69 W |
| 4,233,486 | 11/1980 | Inoue | 219/69 W |
| 4,242,559 | 12/1980 | Roemer et al. | 219/69 M |
| 4,347,423 | 8/1982 | Katsube et al. | 219/69 W |

Primary Examiner—M. H. Paschall
Attorney, Agent, or Firm—Staas & Halsey

[57] ABSTRACT

A wire-cut, electric discharge machine which is provided with auxiliary wire feed means for feeding a wire in a backward direction when the wire is broken, and a wire detector for detecting, at a predetermined position, the extreme end of the broken wire fed in the backward direction. When detecting the extreme end of the broken wire by the wire detector, the feed of the broken wire by the auxiliary wire feed means is stopped to position the extreme end of the broken wire at a predetermined position.

3 Claims, 3 Drawing Figures

WIRE-CUT, ELECTRIC DISCHARGE MACHINE

BACKGROUND OF THE INVENTION

1. Field of the Invention

The present invention relates to a wire-cut, electric discharge machine which is capable of positioning an end of a broken wire at a predetermined position.

2. Description of the Prior Art

In a wire-cut, electric discharge machine, a pulse-like voltage is applied between a wire installed on the wire running system and a workpiece to produce a discharge therebetween, by which the workpiece is cut into an arbitrary shape. During cutting, the wire may be broken in the workpiece unless the cutting conditions i.e., the tension of the wire, the wire take-up speed and so forth are appropriate. In the case of breakage of the wire, it is general practice in the prior art to re-install the wire by manual operation but this is very troublesome and reduces the efficiency of the cutting operation. To avoid this, there is a strong demand for automating the re-installation of the wire.

In the case of cutting a workpiece to form therein a plurality of independent configurations in succession, the prior art employs automatic operations for cutting off a wire after completion of one configuration, feeding the wire to the next cutting position and reinstalling the wire on the running system. In this case, since the wire is cut off at a predetermined position, it can automatically be reinstalled. But, in the case of breakage of the wire during cutting the position of the broken end of the wire is unknown and, accordingly, it is difficult to automate the reinstallation of the wire.

SUMMARY OF THE INVENTION

It is an object of the present invention to provide a wire-cut, electric discharge machine which is designed so that the broken end of a wire can be positioned at a predetermined position.

Another object of the present invention is to provide a wire-cut, electric discharge machine which is capable of automatically reinstalling a wire in case of its breakage.

Briefly stated, the wire-cut, electric discharge machine is provided with auxiliary wire feed means for feeding a wire in a backward direction when the wire is broken, and a wire detector for detecting at a predetermined position the broken end of the wire fed in the backward direction and applying a detection signal to the auxiliary wire feed means to stop it from feeding the broken wire in the backward direction.

DESCRIPTION OF THE PREFERRED EMBODIMENTS

Figure 1:
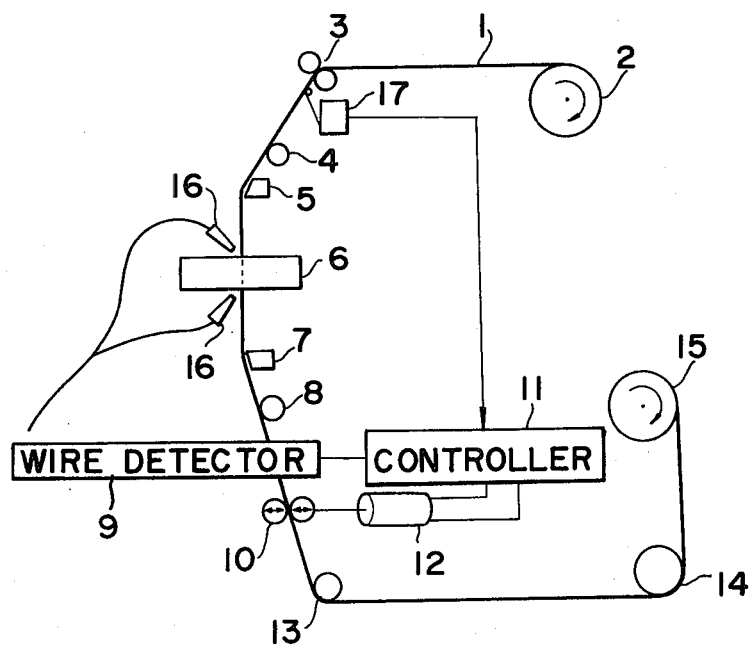
FIG. 1 is explanatory of an embodiment of the present invention.

In FIG. 1, reference numeral 1 indicates a wire; 2 designates a wire take-up reel; 3 identifies wire feed rollers; 4 denotes a feed pin; 5 represents an upper guide; 6 shows a workpiece; 7 refers to a lower guide; 8 indicates another feed pin; 9 designates a wire detector; 10 identifies auxiliary wire feed rollers; 11 denotes a controller; 12 represents a motor; 13 shows a guide roller; 14 refers to a tension brake; 15 indicates a wire supply reel; 16 designates working liquid supply nozzles; and 17 identifies a limit switch for detecting the breakage of the wire 1. The auxiliary wire feed rollers 10 are held out of contact with the wire 1 during normal cutting but, in case of breakage of the wire 1, they grip the wire 1.

When the wire 1 is broken during machining, its tension is reduced to zero thus turning OFF the limit switch 17, by which the controller 11 detects the breakage of the wire 1. The controller 11 drives the motor 12 to rotate the auxiliary wire feed rollers 10, feeding the wire 1 in the direction of the supply reel. When detecting the broken end of the wire 1 fed in the direction of the supply reel, the wire detector 9 applies a detection signal to the controller 11 to stop the motor 12, thus stopping the auxiliary wire feed rollers 10 from rotating. In consequence, the feed of the wire 1 is stopped, so that the end of the broken wire 1 is positioned at a predetermined position, i.e. at the position of the wire detector 9. Accordingly, even when the wire 1 is broken during cutting, its broken end is brought to such a predetermined position; therefore, the wire 1 can automatically be reinstalled.

Figure 2:
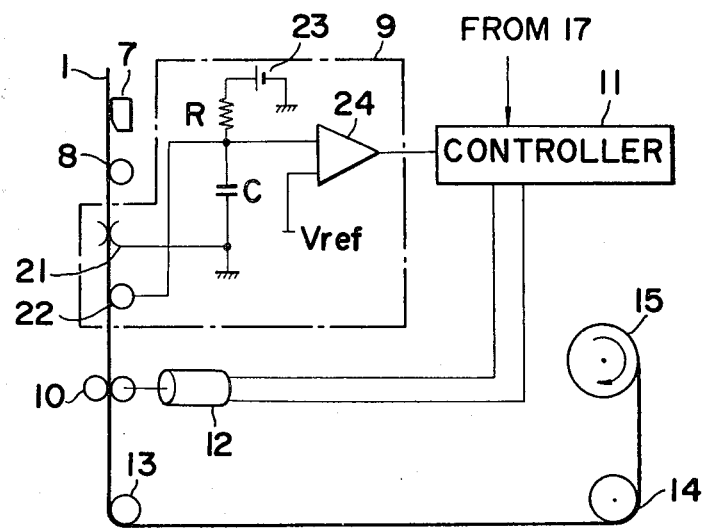
FIG. 2 is a schematic diagram illustrating an example of the arrangement of a wire detector for use in the present invention.

FIG. 2 illustrates an example of the arrangement of the wire detector 9. Reference numeral 21 indicates a wire detecting brush; 22 designates a feed pin for detecting the wire; 23 identifies a power source; 24 denotes a voltage comparator; R represents a resistor; and C shows a capacitor. The other parts corresponding to those in FIG. 1 are identified by the same reference numerals. The voltage comparator 24 provides an output "1" or "0" depending on whether it is supplied with a voltage higher or lower than a reference voltage Vref.

When the wire 1 is broken, the controller 11 drives the motor 12 to rotate the auxiliary wire feed rollers 10, drawing the wire 1 toward the supply reel, as described previously in regard to FIG. 1. While the wire 1 is in contact with the wire detecting brush 21, the voltage applied to the voltage comparator 24 is lower than the reference voltage Vref, so that the output from the voltage comparator 24 is "0". When the wire 1 is drawn away from the wire detecting brush 21, that is, when the wire 1 is moved out of contact with the wire detecting brush 21, the voltage applied to the voltage comparator 24 becomes higher than the reference voltage Vref, so that the voltage comparator 24 produces the output "1". Upon detection of this output, the controller 11 stops the motor 12, stopping the rotation of the auxiliary wire feed rollers 10. By this, the feed of the wire 1 is stopped, positioning its broken end at the predetermined location.

Figure 3:
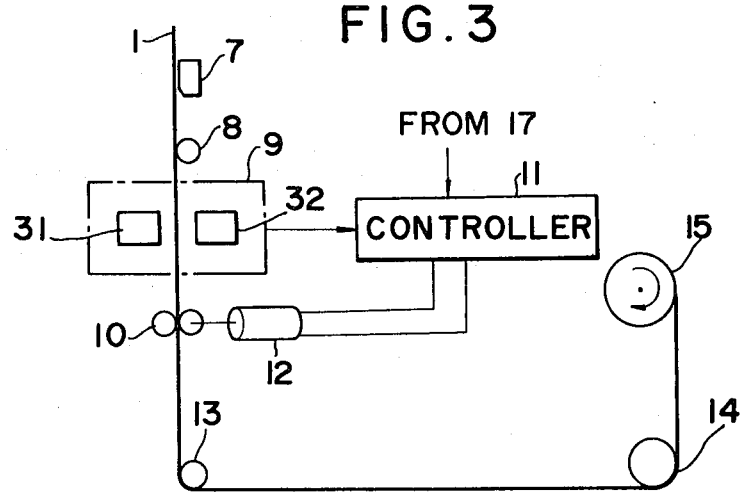
FIG. 3 is a schematic diagram, similar to FIG. 2, showing another example of the wire detector.

FIG. 3 illustrates another example of the arrangement of the wire detector 9. Reference numeral 31 indicates a light emitting element such as a light emitting diode; and 32 designates a photo detector such as a photo transistor. The other parts corresponding to those in FIG. 1 are marked with the same reference numerals.

When the wire 1 is broken, the controller 11 drives the motor 12 to rotate the auxiliary wire feed rollers 10, drawing the wire 1 toward the supply reel, as described previously. When the extreme end or the broken end of the wire 1 passes between the light emitting element 31 and the photo detector 32, light from the light emitting element 31 is incident on the photo detector 32, which applies a detection signal to the controller 11. Upon reception of the detection signal from the photo detector 32, the controller 11 stops the motor 12 to stop the auxiliary wire feed rollers 10 from rotating. Thus, the feed of the wire 1 is stopped, positioning its end at the predetermined position.

Although the foregoing embodiments have been described in connection with the case where the wire is broken while cutting, the present invention is equally applicable to other cases, for example, the case of cutting a work to form therein a plurality of independent configurations.

As has been described in the foregoing, the present invention is provided with the wire detector by which, when the wire is broken, the extreme end of the broken wire fed in a backward direction by the auxiliary wire feed means comprised of the auxiliary wire feed rollers 10, the controller 11 and the motor 12 and is detected at the predetermined position thus applying the detection signal to the auxiliary wire feed means, which stops the feed of the wire by the auxiliary wire feed means, so that the broken end of the broken wire can be positioned at the predetermined position. Accordingly, even if the wire is broken during cutting, it can automatically be reinstalled.

It will be apparent that many modifications and variations may be effected without departing from the scope of the novel concepts of the present invention.

What is claimed is:

1. A wire-cut, electric discharge machine for cutting a workpiece into an arbitrary configuration by discharging a voltage between the workpiece and a wire installed on a wire running system, said wire running system having a wire supply reel, a guide means for guiding the wire from the supply reel, a lower guide means for guiding the wire from the guide means to the workpiece, an upper guide means for guiding the wire from the workpiece and away from the supply reel, a wire feed means for feeding the wire from said upper guide means and a take up means for receiving the wire from the feed means, said machine comprising:
   a wire breakage detector means for detecting the breakage of the wire and for providing a breakage signal responsive to the breakage of the wire;
   auxiliary wire feed means, operatively connected to the wire breakage detector means, for feeding the wire in a direction away from the workpiece and toward the supply reel in response to the breakage signal; and
   a wire detector operatively connected to the auxiliary wire feed means, for detecting, at a predetermined position, the extreme end of the broken wire fed in the direction away from the workpiece and for applying a detection signal to the auxiliary wire feed means to stop the feed of the broken wire by the auxiliary wire feed means, said wire detector means including
   a wire detecting brush for contacting the wire,
   a feed pin for contacting the wire and for detecting the wire,
   a capacitor connected in parallel with the wire between the wire detecting brush and the feed pin,
   a power source connected in series with the capacitor,
   means for receiving a reference voltage, and
   a voltage comparator operatively connected to the wire detecting brush and the reference voltage for comparing a voltage across the capacitor with the reference voltage and for generating the detection signal.

2. A wire-cut, electric discharge machine according to claim 1 wherein the auxiliary wire feed means comprises:
   a motor,
   auxiliary wire feed rollers driven by the motor to feed the broken wire in the direction away from the workpiece, and
   a controller operatively connected to the motor, for stopping the motor when supplied with the detection signal from the wire detector.

3. A wire-cut, electric discharge machine for cutting a workpiece into an arbitrary configuration by discharging a voltage between said workpiece and a wire installed on a wire moving means for moving said wire in a first direction, said machine comprising:
   wire breakage detector means, operatively positioned adjacent to said wire, for detecting the breakage of said wire and for providing a breakage signal responsive to the breakage of said wire;
   wire detector means, operatively positioned adjacent to said wire, for detecting an end of said wire being at a predetermined position, and for providing a detection signal responsive to said end of said wire being at said predetermined position, said wire detector means including
   a wire detecting brush for contacting the wire,
   a feed pin for contacting the wire and for detecting the wire,
   a capacitor connected in parallel with the wire between the wire detecting brush and the feed pin,
   a power source connected in series with the capacitor,
   means for receiving a reference voltage,
   a voltage comparator operatively connected to the wire detecting brush and the reference voltage for comparing a voltage across the capacitor with the reference voltage and for generating the detection signal, and
   auxiliary wire feed means, operatively connected to said wire breakage detector means and to said wire detector means, for feeding said wire in a second direction, opposite said first direction, in response to said breakage signal and for stopping said feeding in said second direction in response to said detection signal.

* * * * *